United States Patent
Neul et al.

(10) Patent No.: US 10,753,742 B2
(45) Date of Patent: Aug. 25, 2020

(54) MICROMECHANICAL YAW RATE SENSOR AND METHOD FOR OPERATING SAME

(71) Applicant: Robert Bosch GmbH, Stuttgart (DE)

(72) Inventors: Reinhard Neul, Stuttgart (DE); Torsten Ohms, Enz-Aurich (DE); Robert Maul, Reutlingn (DE); Mirko Hattass, Stuttgart (DE); Christian Hoeppner, Stuttgart (DE); Odd-Axel Pruetz, Nuertingen (DE); Benjamin Schmidt, Stuttgart (DE); Rolf Scheben, Reutlingen (DE); Friedjof Heuck, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 15/767,271

(22) PCT Filed: Nov. 9, 2016

(86) PCT No.: PCT/EP2016/077041
§ 371 (c)(1),
(2) Date: Apr. 10, 2018

(87) PCT Pub. No.: WO2017/084918
PCT Pub. Date: May 26, 2017

(65) Prior Publication Data
US 2019/0056226 A1 Feb. 21, 2019

(30) Foreign Application Priority Data
Jul. 28, 2016 (DE) .................. 10 2016 213 877

(51) Int. Cl.
*G01C 19/5747* (2012.01)
*G01C 19/5712* (2012.01)

(52) U.S. Cl.
CPC ..... *G01C 19/5747* (2013.01); *G01C 19/5712* (2013.01)

(58) Field of Classification Search
CPC ........... G01C 19/5747; G01C 19/5712; G01C 19/5719; G01C 19/5733; G01C 19/574; G01C 19/5755; G01C 19/5762
(Continued)

(56) References Cited

U.S. PATENT DOCUMENTS

| 8,833,162 B2 | 9/2014 | Seeger et al. |
| 2012/0125101 A1 | 5/2012 | Seeger et al. |
| 2019/0017823 A1* | 1/2019 | Shao .................. G01C 19/5747 |

FOREIGN PATENT DOCUMENTS

DE   10 2011 006 394 A1   10/2012

OTHER PUBLICATIONS

International Search Report corresponding to PCT Application No. PCT/EP2016/077041, dated Feb. 23, 2017 (German and English language document) (5 pages).

* cited by examiner

*Primary Examiner* — Robert R Raevis
(74) *Attorney, Agent, or Firm* — Maginot, Moore & Beck LLP

(57) ABSTRACT

A micromechanical rate-of-rotation sensor includes a first Coriolis element. The micromechanical rate-of-rotation sensor further includes a first drive beam arranged along the first Coriolis element. The first drive beam is coupled via a first spring to the first Coriolis element. The micromechanical rate-of-rotation sensor further includes a first drive electrode carrier extending from the first drive beam in a direction opposite to the first Coriolis element. The first drive electrode carrier is configured to carry a multiplicity of first drive electrodes extending parallel to the first drive beam.

10 Claims, 2 Drawing Sheets

(58) Field of Classification Search
USPC .............. 73/504.02–504.04, 504.12, 504.14
See application file for complete search history.

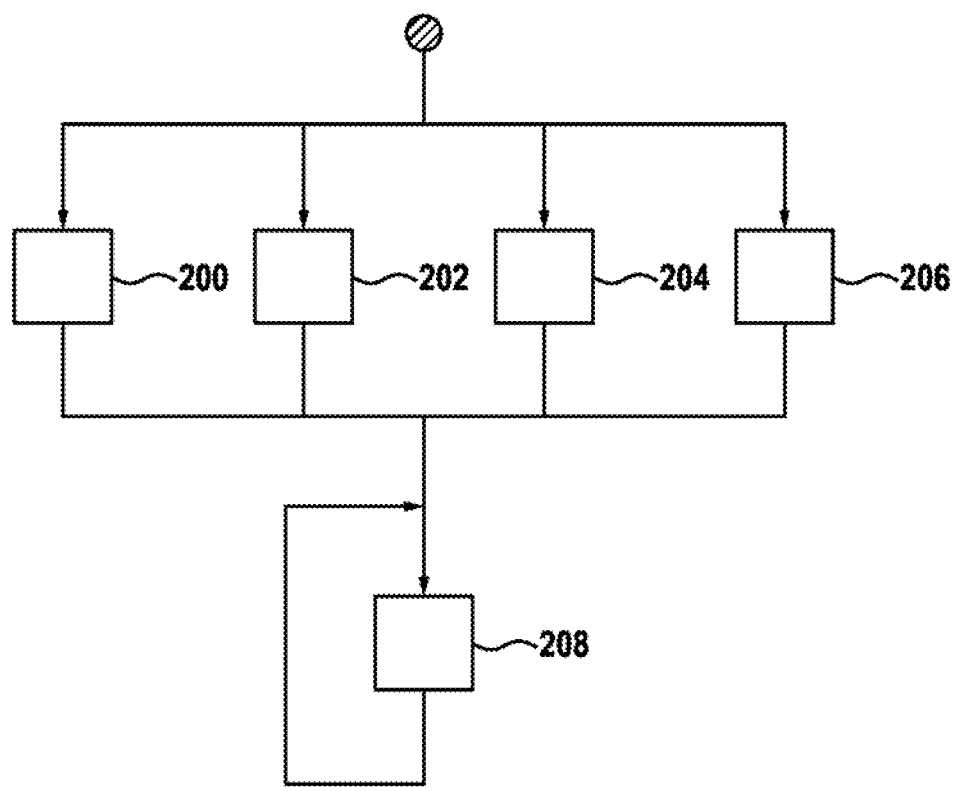

MICROMECHANICAL YAW RATE SENSOR AND METHOD FOR OPERATING SAME

This application is a 35 U.S.C. § 371 National Stage Application of PCT/EP2016/077041, filed on Nov. 9, 2016, which claims the benefit of priority to Serial Nos. DE 10 2015 222 943.2 filed on Nov. 20, 2015 and DE 10 2016 213 877.4 filed on Jul. 28, 2016 in Germany, the disclosures of which are incorporated herein by reference in their entirety.

BACKGROUND

The disclosure relates to a micromechanical rate-of-rotation sensor, in particular to a rate-of-rotation sensor having vibrating Coriolis elements. From a further point of view, the disclosure relates to a method for operating such a micromechanical rate-of-rotation sensor.

Micromechanical rate-of-rotation sensors having Coriolis elements, i.e. having masses driven in vibration, which experience a deflection on account of the Coriolis force acting on the masses during the rotation of the rate-of-rotation sensor, are generally known. Thus, a known micromechanical rate-of-rotation sensor has a vibrating body which extends in an x-y plane and is caused to make a linear vibration along a physical axis (e.g. x-axis) lying in this plane. During a rotation about an axis of rotation (z axis) which is perpendicular to the plane, the Coriolis force effects a displacement of the vibrating body in a direction (y-axis) which is in the plane perpendicular to the vibration axis (x-axis). This displacement can be detected capacitively with the aid of measuring electrodes and evaluated.

As disclosed in DE 10 2011 006 394 A1, such a rate-of-rotation sensor comprises, for example, a first Coriolis element and a second Coriolis element and also a coupling element which couples the first Coriolis element and the second Coriolis element to each other mechanically in an anti-parallel drive mode. The Coriolis elements are surrounded by U-shaped drive elements coupled to one another, which are pierced on the respectively facing sides and, on the limbs, have movable electrodes which project outwards and which engage in the manner of combs in stationary electrodes, which are firmly connected to a substrate by bearing blocks.

For many applications, it is desirable to reduce the overall space needed by the rate-of-rotation sensor.

SUMMARY

Accordingly, a micromechanical rate-of-rotation sensor is provided which has a first Coriolis element, a first drive beam, which is arranged along the first Coriolis element and is coupled to the first Coriolis element via a first spring, and a first drive electrode carrier, which extends from the first drive beam in the direction opposite to the first Coriolis element and carries a multiplicity of first drive electrodes extending parallel to the first drive beam. The drive electrodes extending parallel to the drive beam permit a vibrating drive of the drive beam in the direction parallel to the drive beam by means of, for example, stationary electrodes reaching into the first drive electrodes in the manner of a comb.

From a further point of view, a method for operating such a micromechanical rate-of-rotation sensor is provided.

The fact that the drive electrode carrier extends from the drive beam in the direction opposite to the first Coriolis element means that the Coriolis element can be driven without being surrounded by drive elements which carry drive electrodes. Thus, sides of the Coriolis element that in particular extend at right angles to the drive beam can remain free, which permits a particularly compact design of the rate-of-rotation sensor in the direction parallel to the drive beam. In addition, along the side of the drive beam that faces away from the first Coriolis element, because of the absence of the Coriolis element on this side, a greater number of drive electrode carriers can be provided, the actions of which add up, so that each individual drive electrode carrier needs to carry only a small number of drive electrodes and to have a short length. Therefore, the inventive rate-of-rotation sensor permits a compact design also in the direction at right angles to the drive beam.

According to a preferred development, the micromechanical rate-of-rotation sensor also comprises a second Coriolis element, which is arranged on the side facing away from the first drive beam, beside the first Coriolis element, and also a coupling element which couples the first Coriolis element and the second Coriolis element to form an anti-parallel drive mode. For example, in the anti-parallel drive mode, the first and second Coriolis element execute an anti-parallel vibrating movement in the direction parallel to the drive beam.

Preferably, the coupling element comprises a rocking beam, which extends at right angles to the first drive beam, beside the first and second Coriolis element, and is coupled to the first and second Coriolis element in a sprung manner in each case via a coupling spring rod, and a rocking spring rod, which connects the rocking beam in a sprung manner to an anchoring point placed between the first and second Coriolis element. This implementation makes it possible, besides the coupling to form the anti-parallel drive mode, at the same time to couple the Coriolis elements to form an anti-parallel detection mode in the main extension plane of the rate-of-rotation sensor, in which the drive beam and the Coriolis elements are arranged, and further to form an anti-parallel detection mode out of the main extension plane. In this way, with an extremely compact design, the rate-of-rotation sensor is able to detect a respective rate of rotation for rotations about a first axis of rotation, which extends at right angles to the main extension plane, and about a second axis of rotation, which extends in the main extension plane, at right angles to the drive beam.

According to a preferred development, the first drive electrodes each extend in the direction of a nearest end of the first drive beam. In this way, the drive beam is loaded in tension during operation, which permits greater mechanical stability.

According to a preferred development, the first drive beam is suspended in a sprung manner on suspension springs fixed to the respective ends. Thus, in a simple way, mechanical suspension of the drive beam is effected and it is further made possible for the drive beam to execute a particularly regular vibrating movement, determined by the spring constant of the springs, during operation. The suspension springs are preferably fixed to the drive beam closer to the side opposite to the first Coriolis element. The drive electrode carrier is located on this side, so that the suspension is advantageously made in the vicinity of the centre of gravity.

According to a preferred development, a rotational vibrator, which is arranged on the side of the first drive beam that faces the first Coriolis element, beside the first and second Coriolis element, and a third spring, which couples the rotational vibrator in a sprung manner to the first drive beam, are also provided. This permits a rotation about a still further axis of rotation by means of the rotational vibrator to be detected. Since the rotational vibrator is arranged on the side of the drive beam that faces the first Coriolis element, beside the Coriolis elements, the drive beam can be designed to be particularly long within an overall low overall space extending along both the Coriolis elements and the rotational vibrator, which further stabilises the drive movement.

According to a preferred development, the micromechanical rate-of-rotation sensor also comprises a second drive beam, which is arranged parallel to the first drive beam along the side of the second Coriolis element that faces away from the first Coriolis element, and is coupled to the second Coriolis element via a second spring. In this way, the drive can be provided from two sides in a particularly balanced manner, while via the first spring, the first Coriolis element, the coupling element, the second Coriolis element and the second spring, mechanical coupling of the drive beams to one another, stabilising the drive, is also achieved. Preferably, a second drive electrode carrier is also provided, which extends from the second drive beam in the direction opposite to the first Coriolis element and carries a multiplicity of second drive electrodes extending parallel to the second drive beam. Thus, the drive beams can be designed symmetrically for a particularly balanced drive, while the particularly compact design of the rate-of-rotation sensor in the direction parallel to the drive beam is preserved.

BRIEF DESCRIPTION OF THE DRAWINGS

FIG. 2 shows a flowchart of an operating method for a micromechanical rate-of-rotation sensor according to one embodiment.

If not expressly otherwise mentioned, the same reference symbols in the figures refer to the same or equivalent elements.

DETAILED DESCRIPTION

Figure 1:
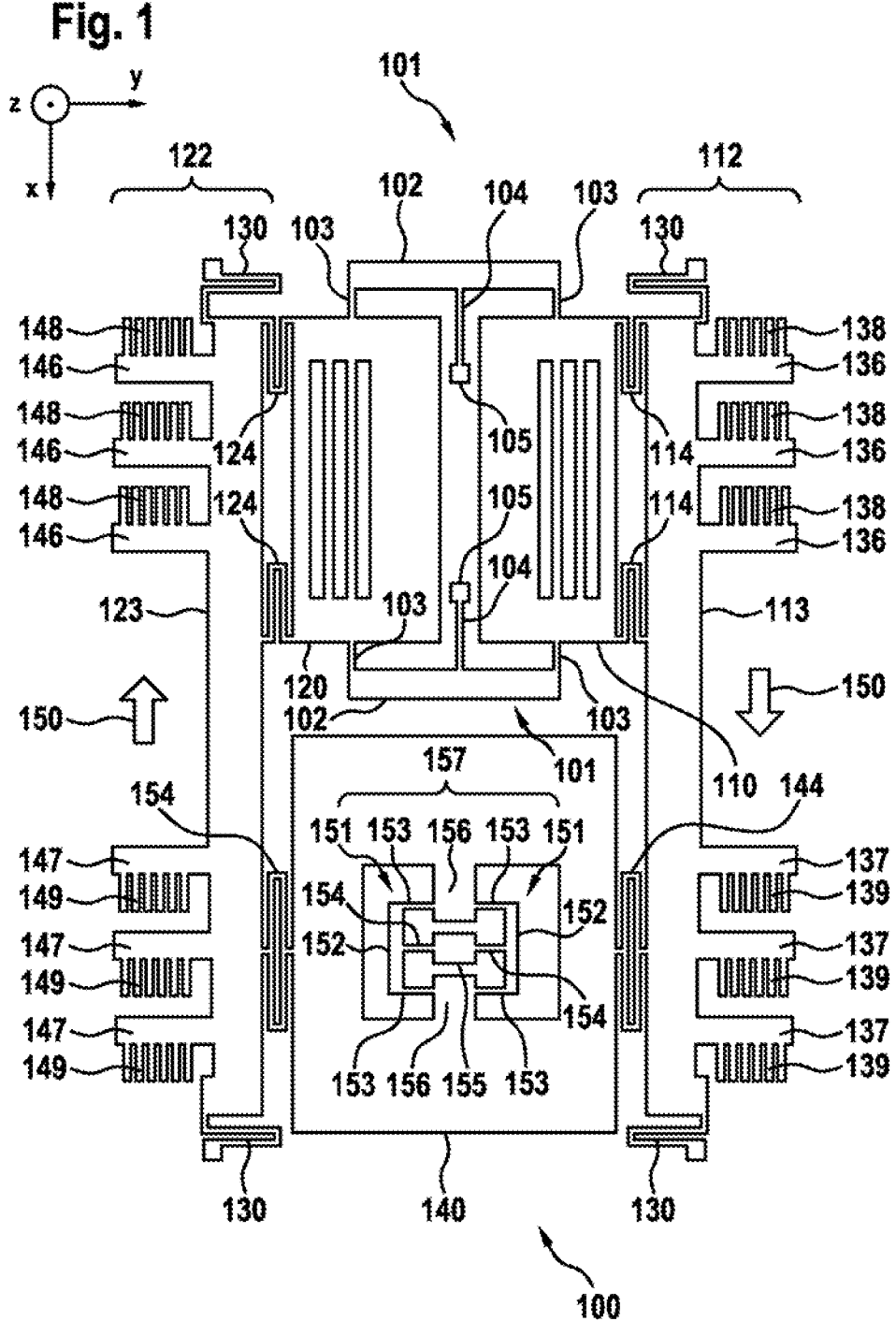
FIG. 1 shows a schematic plan view of a micromechanical rate-of-rotation sensor according to one embodiment of the disclosure, stationary parts not being shown.

FIG. 1 shows a rate-of-rotation sensor 100 according to an exemplary embodiment of the disclosure. FIG. 1 is a plan view of a substrate, not specifically illustrated, with a main extension plane (x-y plane), in which, between a first drive beam 113 and a second drive beam 123, a first Coriolis element 110, a second Coriolis element 120 and a rotational vibrator 140 are arranged. As is indicated graphically in the top left corner of FIG. 1, in FIG. 1 the x direction points from top to bottom, the y direction from left to right and the z direction out of the plane of the drawing towards the viewer.

The first and second Coriolis element 110, 120 are formed as rectangular, frame-like structures of the same shape and size, which are oriented with their long sides parallel to the x direction and are arranged beside each other, so that a long side of the first Coriolis element 110 and a long side of the second Coriolis element 120 are opposite each other, spaced apart by a gap, the short sides of the Coriolis elements 110, 120 being aligned in pairs. The frame structure of the Coriolis elements 110, 120 results from the fact that, in the vicinity of the long sides that are turned away from each other, they each have a grid-like weight reduction area, in which cut-outs extending longitudinally and separated from one another only by thin webs are formed.

On the two pairs of their adjacent short sides that are aligned with one another, the Coriolis elements 110, 120 are coupled to one another by two mirror-symmetrical coupling elements 101 such that they can move. Each coupling element 101 comprises a rocking beam 102, which extends beside the first and second Coriolis element 110, 120, parallel to the mutually aligned short sides, in each case one end of the rocking beam 102 being opposite the centre of a short side. At the two ends of the rocking beam 102, the coupling element 101 has a coupling spring rod 103 in each case, which connects the end of the rocking beam 102 in a sprung manner and over the shortest possible distance to the centre of the opposite short side of the corresponding Coriolis element. Furthermore, the coupling element 101 has a rocking spring rod 104, which extends from the centre of the rocking beam 102, which is opposite the gap between the Coriolis elements 110, 120, as far as a substrate anchoring point 105 placed in the gap, in order to connect the rocking beam 102 in a sprung manner to the substrate.

The individual coupling elements 101 thus have overall the shape of an "E", the rocking spring rod 104 in the present embodiment being designed to be longer than the coupling spring rods 103. For example, the rocking spring rod 104 is two to three times as long as the coupling spring rods 103.

Opposite the long side of the first Coriolis element 110, which is placed at a distance from the second Coriolis element 120, the first drive beam 113 extends in the x direction. The two corners of the Coriolis element 110 on this long side are coupled in a sprung manner by a first spring 114 each to the drive beam 113. At its two ends, the drive beam 113 itself is suspended in a sprung manner, in each case with a suspension spring 130 which is respectively attached closer to the side of the first drive beam 113 that faces away from the Coriolis elements 110, 120, on a substrate anchoring point that is firmly connected to the substrate, in such a way that it can move in a vibrating manner in the x direction.

On the side of the first drive beam 113 that faces away from the Coriolis elements 110, 120, a multiplicity of first drive electrode carriers 136, 137 are formed, which extend away from the first drive beam 113 in the direction of the side opposite to the Coriolis elements 110, 120 and extend substantially parallel to the y direction. Each of the first drive electrode carriers 136, 137 carries a multiplicity of first drive electrodes 138, 139, which are extended parallel to the x direction. In the present embodiment, it should be assumed, by way of example, that the drive beam 113, including the drive electrode carriers 136, 137 and the drive electrodes 138, 139, have a constant thickness in the z direction which is greater than the width of the drive electrodes 138, 139 in the y direction and, for example, can be equal to the width of the drive beam 113 in the y direction. Therefore, the individual drive electrodes 138, 139 have a flat extent parallel to the x and z direction.

In the present embodiment, along the first drive beam 113 there are provided multiple first drive electrode carriers 136, 137, one half of the drive electrode carriers 136 being arranged grouped towards one end of the first drive beam 113, and the other half of the drive electrode carriers 137 being arranged grouped towards the other end of the first drive beam 113.

Between the two groups, in the centre of the first drive beam 113, there is a section that is free of drive electrode carriers. The respective drive electrodes 138, 139 on the two groups of drive electrode carriers 136, 137 each point towards the side of the nearest end of the first drive beam 113.

The second drive beam 123 extends mirror-symmetrically with respect to the first drive beam 113, opposite the long side of the second Coriolis element 120 which is at a distance from the first Coriolis element 110. The two corners of the second Coriolis element 120 on this long side are coupled in a sprung manner by a second spring 124 each to the second drive beam 123. On the side of the second drive beam 123 facing away from the Coriolis elements 110, 120 there are formed a multiplicity of second drive electrode carriers 146, 147, which extend away from the second drive beam 123 in the direction opposite to the Coriolis elements 110, 120. Each second drive electrode carrier 146, 147 carries a multiplicity of first drive electrodes 148, 149. Because of the mirror symmetry of the arrangement comprising the first drive beam 113, the first springs 114 and the first Coriolis element 110 with the arrangement comprising the second drive beam 123, the second springs 124 and the second Coriolis element 120, for further details reference is made to the above explanations relating to the first drive beam 113.

In the present embodiment, the two drive beams 113, 123 are each aligned flush with one end of the long sides of the Coriolis elements 110, 120, but on the other hand project beyond the other end, the rotational vibrator 140 being arranged in the further space formed beside the Coriolis elements 110, 120 between the drive beams 113, 123. By using a third and fourth spring 144, 145, the rotational vibrator 140 is coupled to the first and, respectively, second working beam 113, 123.

In the present embodiment, the rotational vibrator 140 has a rectangular outline, the long sides of which are formed so as to be only slightly longer than the short sides and, each extending in parallel to one of the drive beams 113, 123, are located opposite the latter, forming a gap. This permits a particularly compact design of the rate-of-rotation sensor and utilization of the overall space. In alternative embodiments, the rotational vibrator 140 can be configured to be, for example, square, circular or elliptical.

At an axial position of the rotational vibrator 140 which is located close to the geometric centre of the rotational vibrator 140 there is formed a rotational vibrator bearing 157, which supports the rotational vibrator 140 rotatably and in a vibrating manner about a rotational vibration axis running in the z direction through the axial position through a substrate anchoring point 155. It is noted that, in alternative embodiments, the axial position can also be located exactly at the geometric centre of the rotational vibrator 140 or another position, provided that the rotational vibrator 140 is able to execute a vibrating rotational movement about the rotational vibration axis running through the axial position. Preferably, the centre of gravity of the rotational vibrator 140 is located at the axial position. The rotational vibrator bearing 157 comprises a rectangular cut-out in the rotational vibrator 140, within which the substrate anchoring point 155 is located. Two webs 156 extend from two opposite edges of the cut-out in the direction of the substrate anchoring point 155, a space remaining respectively between the distal end of each web 156 and the substrate anchoring point 155.

In the areas of the cut-out that remain on both sides of the webs 156, the rotational vibrator bearing 157 has a respective mounting element 151, which connects the webs 156 and the substrate anchoring point 155 to each other. Each mounting element 151 comprises a rocking beam 152, which extends beside the webs 156 and the substrate anchoring point 155, parallel to the mutually aligned webs 156, in each case one end of the rocking beam 152 being opposite the end of a web 156. At the two ends of the rocking beam 152, the mounting element 151 has a mounting spring rod 153 in each case, which connects the end of the rocking beam 152 in a sprung manner and over the shortest distance to the associated web 156. Furthermore, the mounting element 151 has a rocking spring rod 154, which extends from the centre of the rocking beam 152 that is opposite the substrate anchoring point 155 as far as the substrate anchoring point 155, in order to connect the rocking beam 152 in a sprung manner to the substrate. The individual mounting elements 151 thus have the shape of an "E" overall, in a similar way to the coupling elements 101, 102, the rocking spring rod 154 and the mounting spring rods 153 being designed to be equally long in the present embodiment.

During operation of the micromechanical rate-of-rotation sensor 100, the drive electrodes 138, 139, 148, 149 and associated static electrodes (not shown), which are immovable with respect to the substrate and each mesh with the drive electrodes 138, 139, 148, 149, are energised in a coordinated manner with different, time-alternating electrical voltages, in such a way that the drive beams 113, 123 are set into an anti-parallel drive mode 150, in which they execute a vibratory movement phase-shifted by 180° with respect to each other along the x axis.

For example, while the drive beams 113 with the drive electrodes 138, 139, 148, 149 are kept at a constant earth potential, first of all an electrical voltage with respect to earth is applied by means of an electronic control device (not shown) to the static electrodes which mesh with the drive electrodes 138 on the first drive beam 113 that point towards the side of the Coriolis elements 110, 120 (upwards in FIG. 1), and the static electrodes which mesh with the drive electrodes 149 on the second drive beam 123 that point towards the opposite side of the rotational vibrator 140 (downwards in FIG. 1), so that the first drive beam 113 is accelerated by the electrostatic forces in the direction pointing upwards in FIG. 1, while the second drive beam 123 is accelerated by the electrostatic forces in the direction pointing downwards in FIG. 1. The applied voltage is then switched off, whereupon the drive beams 113, 123 are retarded by the restoring forces of the suspension springs 130 and are accelerated again in the direction of the initial position.

Subsequently, an electric voltage with respect to earth is applied to the static electrodes which mesh with the drive electrodes 148 on the second drive beam 123 that point upwards in FIG. 1 and the static electrodes which mesh with the drive electrodes 139 on the first drive beam 113 that point downwards in FIG. 1, so that the first drive beam 113 is accelerated by the electrostatic forces in the direction pointing downwards in FIG. 1, while the second drive beam 123 is accelerated by the electrostatic forces in the direction pointing upwards in FIG. 1. The applied voltage is then switched off again, whereupon the drive beams 113, 123 are initially retarded by the restoring forces of the suspension springs 130 and then accelerated in the direction of the initial position.

Here, the above activation can be repeated advantageously with a time period which coincides substantially with the natural frequency of the anti-parallel vibration mode 150, in which a first drive mass 112 comprising the first drive beam 113, the first drive electrode carriers 136, 137 and the first drive electrodes 138, 139, and a second drive mass 112 comprising the second drive beam 123, the second drive electrode carriers 146, 147 and the second drive electrodes 148, 149, vibrate in opposite phase along the x axis. In this drive mode 150, on account of the coupling via the first spring 114, the first Coriolis element 110 executes a vibratory movement which is phase-shifted by a constant angle with respect to the first drive mass 112 (e.g. is in phase), while, on account of the coupling via the second spring 124, the second Coriolis element executes a vibratory movement which—e.g. given symmetrical formation and activation as in the present embodiment—is phase-shifted by likewise the constant angle with respect to the second drive mass 112. This means that the first Coriolis element 110 and the second Coriolis element 120 execute an anti-parallel vibratory movement in the direction parallel to the drive beam, which is additionally stabilised by the mechanical coupling via the coupling elements 101, 102.

In the above anti-parallel drive mode 150, on account of the coupling via the third and fourth springs 144, 145, the rotational vibrator 140 is also caused to make a vibratory rotational movement about the axis extending in the z direction through the substrate anchoring point 155 of the rotational vibrator bearing 157. Via, firstly, the third spring 144, the rotational vibrator 140 and the fourth spring 154 and, secondly, the first spring 114, the first Coriolis element 110, the coupling elements 101, the second Coriolis element 120 and the second spring 124, mechanical coupling results between the vibratory movements of the first and second drive mass 112, 122, which stabilises the anti-parallel drive mode 150.

If the rate-of-rotation sensor 100 is rotated about the x axis with continuous execution of the anti-parallel drive mode 150, a torque acts on the rotational vibrator 140, which deflects the rotational vibrator out of the main extension plane about the axis going through the third and fourth spring 144 and the rocking spring rods 154 of the mounting elements 151.

If the rate-of-rotation sensor 100 is rotated about the y axis, forces act on the Coriolis elements 110, 120, which deflect the latter in mutually opposite directions out of the main extension plane. Here, as a result of the rocking beam 102 of the coupling elements 101 tilting about the associated rocking spring rods 104, stabilising mechanical coupling between the deflections of the two Coriolis elements 110, 120 takes place.

If the rate-of-rotation sensor 100 is rotated about the z axis, forces act on the Coriolis elements 110, 120, which deflect the latter in mutually opposite directions parallel to the y axis. Here, stabilising mechanical coupling between the deflections of the two Coriolis elements 110, 120 takes place as a result of bending of coupling spring rods 103. Detection of the deflections of the Coriolis elements 110, 120 and of the rotational vibrator can be carried out in the above cases can in each case via capacitance changes on suitably positioned measuring electrodes (not shown).

FIG. 2 shows a flowchart for a method for operating a micromechanical rate-of-rotation sensor having a first and second Coriolis element, which are arranged beside each other and are coupled by a coupling element to form an anti-parallel drive mode, as, for example, of the previously described rate-of-rotation sensor 100 from FIG. 1.

In step 200 to 206, the rate-of-rotation sensor is produced by means of a micromechanical process. In step 200, a first drive beam is provided, which is arranged along the first Coriolis element and is coupled via a first spring to the first Coriolis element. In step 202, a first drive electrode carrier is provided, which extends from the first drive beam in the direction opposite to the first Coriolis element and carries a multiplicity of first drive electrodes extending parallel to the first drive beam. In step 204, a second drive beam is provided, which is arranged parallel to the first drive beam, along the side of the second Coriolis element that faces away from the first Coriolis element, and is coupled via a second spring to the second Coriolis element. In step 206, a second drive electrode carrier is provided, which extends from the second drive beam in the direction opposite to the first Coriolis element and carries a multiplicity of second drive electrodes extending parallel to the second drive beam. It is noted that, in FIG. 2, although the steps 200 to 206 are illustrated as being carried out simultaneously, in alternative embodiments within the context of a suitable micromechanical or other production method, they can also be carried out one after another, for example.

In step 208, a first multiplicity of static electrodes which mesh with the first drive electrodes, and a second multiplicity of static electrodes which mesh with the second drive electrodes are activated in a coordinated manner by applying an electrical voltage or a plurality of electrical voltages, in order to drive the first and second Coriolis element in the anti-parallel drive mode.

The invention claimed is:

1. A micromechanical rate-of-rotation sensor, comprising:
   a first Coriolis element;
   a first drive beam arranged along the first Coriolis element and coupled via a first spring to the first Coriolis element; and
   a first drive electrode carrier extending from the first drive beam in a direction opposite to the first Coriolis element and configured to carry a multiplicity of first drive electrodes extending parallel to the first drive beam.

2. The micromechanical rate-of-rotation sensor according to claim 1, further comprising:
   a second Coriolis element arranged on a side facing away from the first drive beam, beside the first Coriolis element; and
   a coupling element configured to couple the first Coriolis element and the second Coriolis element to form an anti-parallel drive mode.

3. The micromechanical rate-of-rotation sensor according to claim 2, wherein the coupling element includes:
   a rocking beam, which extends at right angles to the first drive beam, beside the first and second Coriolis element, and is coupled to the first and second Coriolis element in a sprung manner in each case via a coupling spring rod; and
   a rocking spring rod, which connects the rocking beam in a sprung manner to an anchoring point placed between the first and second Coriolis element.

4. The micromechanical rate-of-rotation sensor according to claim 2, further comprising:
   a rotational vibrator arranged on a side of the first drive beam that faces the first Coriolis element, beside the first and second Coriolis element; and
   a third spring configured to couple the rotational vibrator in a sprung manner to the first drive beam.

5. The micromechanical rate-of-rotation sensor according to claim 2, further comprising:
   a second drive beam arranged parallel to the first drive beam along a side of the second Coriolis element that faces away from the first Coriolis element and is coupled via a second spring to the second Coriolis element.

6. The micromechanical rate-of-rotation sensor according to claim 1, wherein the multiplicity of first drive electrodes each extend in a direction of a nearest end of the first drive beam.

7. The micromechanical rate-of-rotation sensor according to claim 1, wherein the first drive beam is suspended in a sprung manner by suspension springs fixed to the respective ends on a side opposite to the first Coriolis element.

8. The micromechanical rate-of-rotation sensor according to claim 5, further comprising:

a second drive electrode carrier extending from the second drive beam in a direction opposite to the first Coriolis element and configured to carry a multiplicity of second drive electrodes extending parallel to the second drive beam.

9. A method for operating a micromechanical rate-of-rotation sensor having a first and second Coriolis element arranged beside one another and coupled by a coupling element to form an anti-parallel drive mode, the method comprising:

providing a first drive beam arranged along the first Coriolis element and is coupled via a first spring to the first Coriolis element;

providing a first drive electrode carrier extending from the first drive beam in a direction opposite to the first Coriolis element and configured to carry a multiplicity of first drive electrodes extending parallel to the first drive beam; and activating a first multiplicity of static electrodes, which mesh with the first drive electrodes, in order to drive the first and second Coriolis element in the anti-parallel drive mode.

10. The method according to claim 9, further comprising:

providing a second drive beam arranged parallel to the first drive beam along a side of the second Coriolis element that faces away from the first Coriolis element and is coupled via a second spring to the second Coriolis element; and providing a second drive electrode carrier extending from the second drive beam in the direction opposite to the first Coriolis element and configured to carry a multiplicity of second drive electrodes extending parallel to the second drive beam, wherein the activation step includes a coordinated activation of a second multiplicity of static electrodes, which mesh with the second drive electrodes.

* * * * *

UNITED STATES PATENT AND TRADEMARK OFFICE
CERTIFICATE OF CORRECTION

PATENT NO. : 10,753,742 B2
APPLICATION NO. : 15/767271
DATED : August 25, 2020
INVENTOR(S) : Neul et al.

Page 1 of 1

It is certified that error appears in the above-identified patent and that said Letters Patent is hereby corrected as shown below:

On the Title Page

In item (72):
In Line 2, "Enz-Aurich" should read --Vaihingen/Enz-Aurich--.
In Line 3, "Reutlingn" should read --Reutlingen--.

In item (30), the following foreign application priority claim should be added:
--Nov. 20, 2015 (DE) .................. 10 2015 222 943--.

Signed and Sealed this
Twenty-fourth Day of November, 2020

Andrei Iancu
*Director of the United States Patent and Trademark Office*